United States Patent [19]

Satanovsky

[11] Patent Number: 5,641,522
[45] Date of Patent: Jun. 24, 1997

[54] PELLETIZER FOR EXTRUDER

[75] Inventor: Yan Satanovsky, Upper Saddle River, N.J.

[73] Assignee: Werner & Pfleiderer Corporation, Ramsey, N.J.

[21] Appl. No.: 557,929

[22] Filed: Nov. 14, 1995

Related U.S. Application Data

[63] Continuation of Ser. No. 264,596, Jun. 23, 1994, abandoned.

[51] Int. Cl.[6] .................................. B28B 11/16; B29B 9/06
[52] U.S. Cl. .......................... 425/72.1; 264/142; 264/169; 425/232; 425/311; 425/313
[58] Field of Search ................................ 425/311, 313, 425/DIG. 230, 308, 72.1, 232, 225; 264/142, 141, 143, 169

[56] References Cited

U.S. PATENT DOCUMENTS

| | | | |
|---|---|---|---|
| 2,525,135 | 10/1950 | Huff | 425/85 |
| 3,673,298 | 6/1972 | Miller | 264/142 |
| 3,676,029 | 7/1972 | Hopkin | 264/142 |
| 3,753,637 | 8/1973 | Gasior et al. | 425/313 |
| 3,973,890 | 8/1976 | Porter et al. | 425/311 |
| 4,059,206 | 11/1977 | Ellwood | 425/311 |
| 4,212,617 | 7/1980 | Bagdan et al. | 425/311 |
| 4,413,971 | 11/1983 | Nettleton | 425/311 |
| 4,421,470 | 12/1983 | Nakamura | 425/313 |
| 4,461,737 | 7/1984 | Voss | 425/313 |
| 4,580,967 | 4/1986 | Gutierrez-Rubio | 264/142 |
| 4,728,275 | 3/1988 | DiLullo et al. | 425/311 |
| 4,818,450 | 4/1989 | Hall et al. | 425/308 |
| 5,052,912 | 10/1991 | Masao | 425/311 |
| 5,085,815 | 2/1992 | Yeh et al. | 264/142 |

FOREIGN PATENT DOCUMENTS

| | | | |
|---|---|---|---|
| 55-90309 | 7/1980 | Japan | 264/142 |
| 56-148511 | 11/1981 | Japan | 264/142 |
| 57-123016 | 7/1982 | Japan | 264/142 |
| 62-5814 | 1/1987 | Japan | 425/308 |

*Primary Examiner*—Jeffery R. Thurlow
*Attorney, Agent, or Firm*—William Squire

[57] ABSTRACT

A stationary axle is secured adjacent to an extruder of plastic or other material forming a strand. A rotor rotates about the axle and carries a plurality of axially extending cutters for pelletizing the strand. The shaft has an internal fluid conduit carrying pressurized air. A sleeve is fixed to and over the shaft and has a recess forming a fluid manifold in communication with the conduit and the rotor. The recess has a given angular extent about the sleeve. A plurality of annularly spaced linear arrays of passages in the rotor communicate with the recess manifold in accordance with their angular position about the shaft. The passages of each array are aligned with the edge of a different cutter for sequentially generating arrays of streams of pressurized air impinging upon the cutters after pelletizing as the rotor rotates.

26 Claims, 2 Drawing Sheets

PELLETIZER FOR EXTRUDER

This application is a continuation of application Ser. No. 08/264,596, filed Jun. 23, 1994, abandoned.

This invention relates to pelletizers, and in particular, to pelletizers with cooling devices for cooling pelletizing cutters during extrusion of various materials such as thermoplastics, rubber compounds, engineering resins, polyesters (PET), liquid crystal polymers (LCP), polybutylene (PBT), starched based compounds including food products and expanded starch based and sugar based food compounds.

Cooling devices for pelletizers are required to cool the cutters, sometimes referred to as blades or knives, to preclude material build up on the cutters. The cutters are heated due to the elevated temperature of certain of the extruded materials in the above mentioned groups being cut and due to the friction encountered during cutting. The cutters if permitted to be heated cause the product to soften and adhere thereto. The cutters carried by a rotor cut the emerging die formed strands of heat or otherwise softened extruded material prior to hardening. The strands have sufficient body to form pellets when so cut.

Prior art systems such as shown in U.S. Pat. No. 4,269,584 address this problem by spraying the cutters with an external cooling stream. A similarly externally directed cooling stream is shown in U.S. Pat. No. 3,753,637. The streams are spaced from the cutters, tend to be inefficient and in many instances provide limited success. Further, there is a tendency of some prior art stream cooled systems to over spray onto the die, cooling the die and interfering with the extrusion process. Also, the sprays are not efficient in cleaning the cutters of extruded material build up.

The present inventor recognizes a need for a pelletizer with a cooling device which effectively cools the cutters without cooling the extruding die and can clean the cutters of adhering particles.

A pelletizer according to the present invention for applying cooling fluid from a source to cutters for pelletizing material extruded through a die comprises rotor means having a peripheral surface and rotatably secured for rotation about an axis, the rotor means including internal conduit means selectively coupled to the source of fluid in a given angular position of the rotor means about the axis for generating at least one radially outwardly directed stream of cooling fluid in the given angular position when coupled and cutter means secured to the peripheral surface of the rotor means for cutting the extruded material and including at least one cutting edge positioned for receiving the generated cooling fluid stream in the selected angular position.

In a further embodiment, an apparatus for pelletizing material extruded through a die comprises shaft means, rotor means having a peripheral surface and rotatably secured to the shaft means for rotation about an axis, the shaft means and rotor means each including cooperating internal conduit means selectively coupled in a given angular position of the rotor means about the shaft means for generating at least one radially outwardly directed stream of cooling fluid when coupled; and cutter means secured to the peripheral surface of the rotor means for cutting the extruded material and including at least one cutting edge positioned for receiving the generated stream in the selected angular position.

In accordance with a further embodiment the apparatus includes a plurality of cutting edges each extending in an axial direction and spaced about the rotor means peripheral surface, the cooperating internal conduit means generating an axially aligned array of cooling fluid streams for simultaneously impinging on one of the edges.

In accordance with a still further embodiment, the cooperating internal conduit means is arranged to generate a plurality of axially aligned arrays of cooling fluid streams, each array for impinging on a different cutting edge.

BRIEF DESCRIPTION OF THE DRAWING

In FIG. 2, apparatus 10 includes an extruder 12 for hot thermoplastic material 14, by way of example, formed into a strand 16 through an extrusion die 18 along axis 19. Extruder 12 is commercially available and can be of any conventional design used for pelletizer apparatuses. Extruder 12 is secured to housing 20 of pelletizer assembly 22. The housing is preferably steel or aluminum. Extruder 12, in the alternative, can be used for cutting the extruded material of any desired material in a given implementation.

In FIGS. 1 and 2, pelletizer assembly 22 includes a preferably steel disc plate 24 secured to housing 20 at opening 26 in housing 20, the plate having a flange 28 overlying the housing 20. The housing 20 forms a cavity 21 into which the extruded strand 16 is ejected along and on axis 19. In the alternative, in other implementations, the extruded material may be formed by a plurality of dies (not shown) forming a plurality of strands along an axis such as axis 19. The plate 24 is secured stationary to housing 20. An annular stepped recess 30 and a through bore 31 lying on axis 33 in communication with recess 30 are formed in plate 24. An axle 32 defining longitudinal axis 33 and having a circular cylindrical head 34 seated in recess 30 is secured stationary to plate 28. The axle 32 has a circular cylindrical shaft 36 passing through bore 31 and extending from head 34. An annular bearing 38 having an inner race 42 and an outer race 44 is secured to shaft 36 in a shaft stepped annular recess. The inner race 42 is secured to and about shaft 36.

Figure 1:
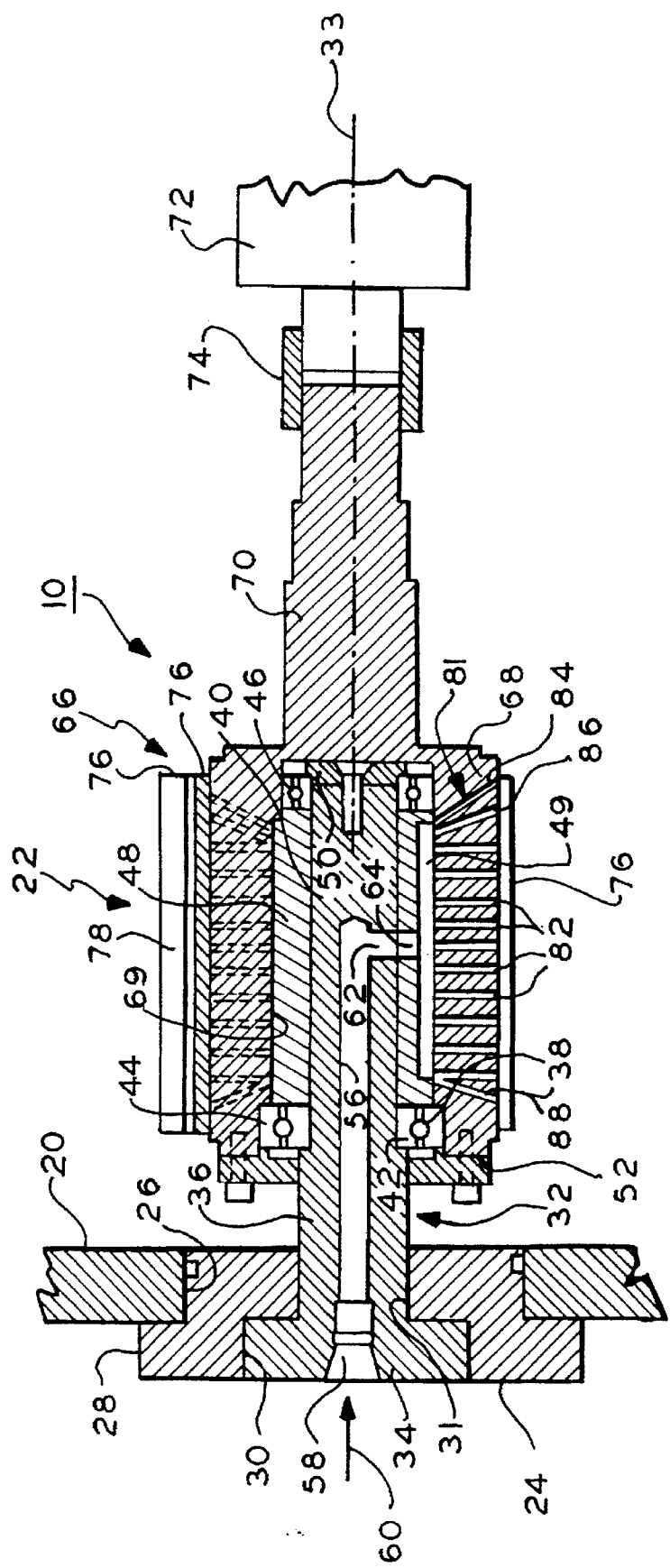
FIG. 1 is a longitudinal sectional elevation view of an apparatus according to the present invention taken along lines 1—1 of FIG. 2.

Axially extending away from head 34 and bearing 38 is a shaft 36 circular cylindrical portion 40 of smaller diameter than shaft 36 at head 34. At the end of portion 40 opposite bearing 38 is a second annular bearing 46 having an inner and outer race with the inner race secured about and to shaft 36 portion 40. A circular cylindrical preferably steel sleeve 48 is secured about portion 40 with a longitudinal keyway and mating key 45, or in the alternative, by press fit.

Figure 2:
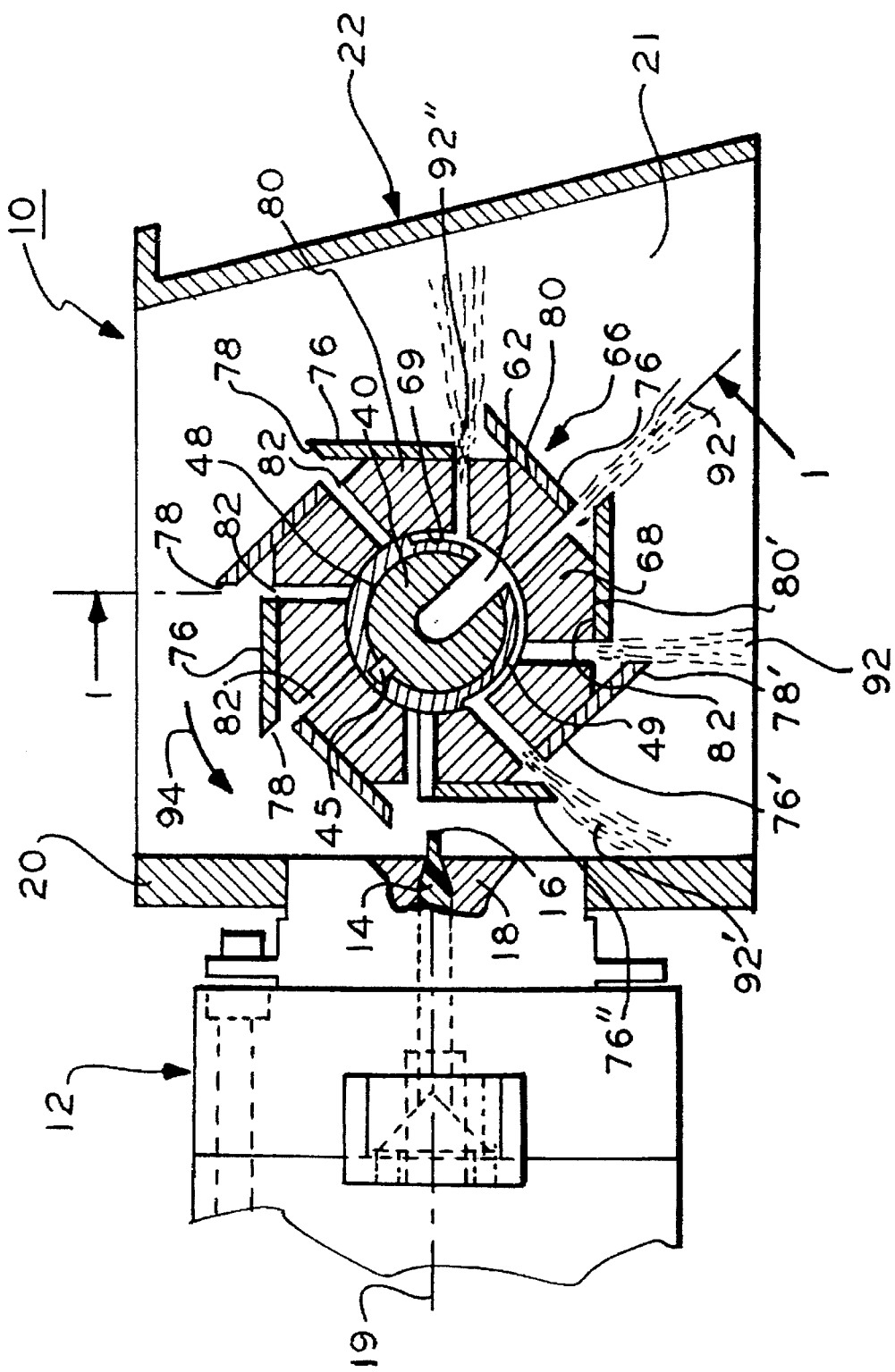
FIG. 2 is a transverse sectional elevation view of the apparatus according to an embodiment of the present invention.

An end clamp 50 which may be a washer or retaining ring via a screw axially clamps the bearing 46 inner race to the sleeve 48. The sleeve has a semi-annular axially extending recess 49. The recess 49 extends about the axis 33 and periphery of the sleeve 48 approximately 180° in this embodiment, but could be a smaller or greater angular extent in accordance with a given implementation as will be explained below. The recess 49 extends for substantially the axial length of the sleeve 48, but is not in communication with the ends of the sleeve. Therefore, the recess 49 overlies an area of about 50% of the peripheral surface of the sleeve 48. In FIG. 2, the recess 49 is in fixed positioned downstream in direction of arrow 94 relative to the extrusion die 18 just immediately below extrusion axis 19.

The shaft 36 and shaft portion 40 are formed with an internal axially extending conduit 56 lying on axis 33. The conduit 56 has a fitment 58 at one end within the head 34. The fitment 58 receives a fluid connector (not shown) for supplying coolant, e.g., preferably air or, in the alternative, a liquid such as water, under pressure to the conduit 56 in the direction of arrow 60. The air may be supplied at a pressure of 100 psi for example. The end of conduit 56 opposite fitment 58 internal shaft portion 40 has a right angle bend conduit portion 62. Portion 62 is aligned with an aperture 64 in sleeve 48, the sleeve being axially and angularly fixed in position relative to the shaft 36 and, thus, relative to portion 62. Aperture 64 is in communication with the recess 49.

A rotor assembly 66 comprises a rotor 68 and a shaft 70 extending cantilevered from the rotor 68 concentric with and along axis 33. The shaft 70 is connected by a coupler 74 to a rotary drive 72 for rotating the shaft 70 and rotor 68 about axis 33 in the direction of arrow 94, FIG. 2. The rotor 68 is secured to the outer races of bearings 38 and 46 so the rotor rotates relative to the axle 32 and to the sleeve 48. A disc clamp 52 through which shaft 36 passes clamps the end of rotor 68 adjacent to the plate 24 to the bearing 38 outer race and rotates with the rotor 68.

Rotor 68 is an axially extending symmetrical heptagon, FIG. 2, and has a circular cylindrical axially bore 69 which closely receives the sleeve 48. The rotor 68 surrounds the sleeve 48 concentrically about axis 33 forming a chamber with recess 49. The rotor 68 may be spaced slightly from the sleeve 48. The resultant leakage of cooling air therebetween from recess 49 is acceptable. In the alternative, the sleeve may be other metals such as bronze. When a coolant fluid is a liquid such as water then a conventional seal (not shown) in addition is preferable between the sleeve 48 and the rotor 68 bore 69. In the alternative, the rotor may be a circular cylinder or have any desired shape with an desired number of sides in accordance with a given implementation.

Secured to each heptagonal side 80 of rotor 68 is a cutter 76 with a tapered cutting edge 78. The tapered portion of edges 78 generally face toward the rotor 68 and are cantilevered over a corresponding next adjacent downstream rotor peripheral heptagonal side 80. For example, cutter 76', FIG. 2, edge 78' overlies a next adjacent heptagonal side 80' of rotor 68.

Seven linear arrays 81 of fluid passages 82 (FIG. 1) are aligned parallel to axis 33 symmetrically spaced about the axis 33. Each array 81 is located in and corresponds to a different rotor side 80. The passages of each array pass through that corresponding side. The end passages 84, 86 at one end of the rotor 68 and passage 88 at the other end, FIG. 1, are non-radially extending whereas the remaining passages 82 are generally radial as shown in FIG. 2. These passage orientation angles are not important. Each passage of an array 81 such as passages 82, 84–88 are in fluid communication with the bore 69 of the rotor 68 at the interior passage end and with the peripheral rotor surface at a corresponding heptagonal side such as side 80, FIG. 2, at the outer passage end.

The arrays 81 are generally radially aligned with and each extend along the length of the cutting edge 78 of the corresponding cutter 76. The inner ends of the passages 82 are positioned so that when radially aligned with the recess 49 in sleeve 48 all passages of a given array 81 are in fluid communication with recess 49 as seen in FIG. 1. In the case of recess 49 having an angular extent about axis 33 of 180°, three arrays 81 of passages 82–88 are in simultaneous fluid communication with the recess 49 as the rotor 68 rotates in the direction of arrow 94.

In operation, the extruded strand 16 is forced into the cavity 21 of housing 20. The drive 72, FIG. 1, rotates the rotor 68 in the direction of arrow 94, FIG. 2, the axis 33 being normal to the extruded strand 16 longitudinal axis 19.

Pressurized air from a source not shown and at preferably 100 psi is forced into conduit 56 and, via conduit portion 62 and sleeve aperture 64, is forced into recess 49. The recess 49 forms a manifold of pressurized air. This air is forced through the passages 82–88 of each array 81 aligned with the recess 49 as the rotor 68 rotates. The air at high pressure is thus forced through the passages 82–88 forming high pressure air streams 92.

The recess 49 is positioned downstream from the plastic extruded strand 16 in the direction of arrow 94. Therefore, each cutter edge 78 as it rotates in direction of arrow 94 by the rotor 68 will wipe against or closely spaced to the die 18 of the extruder 12 cutting the strand 16. The tapered interior surface of the edge 78 faces away from the die 18 and tends to receive adhering plastic material. The edge 78 external surface is wiped clean of plastic material as the edge passes by the die 18.

Immediately thereafter, because of the relative downstream angular position of recess 49 to die 18, an initial linear array 81 of pressurized air streams 92' are produced. These streams impinge upon the tapered edge 78 of cutter 76" which has just completed cutting a pellet from strand 16. This array of streams is continuously generated as long as the corresponding array 81 of passages communicate with the recess 49 during the rotor rotation. These streams continuously cool the edge 78 of the corresponding cutter 76" and clean this edge of residual plastic material at the same time. As the rotor continues to rotate in the direction of arrow 94, cutter 76" is continuously cooled and cleaned by these streams. The streams continue to be generated until the array of passages corresponding to cutter 76" no longer are in communication with the recess 49.

This action occurs preferably about 180° from the streams 92' location to the approximate position of streams 92" which will be generated during further rotation in direction 94. Therefore, for approximately 50% of the rotation of the rotor 68 in one revolution, each cutter, such as the cutter 76" is being cooled and cleaned. This is illustrated by the remaining streams 92 and 92" of three arrays 81 impinging on the corresponding cutters 76 downstream from cutter 76". Each of the cutters on the rotor is sequentially cleaned and cooled simultaneously in successive periods.

None of the cooling streams impinge upon the die 18. These streams are directed in a direction away from the die 18 and do not prematurely cool the die as occurs in some prior art pelletizers.

It will occur to one of ordinary skill in this art that various modifications may be made to the disclosed apparatus. For example, the sleeve 48 may be omitted and replaced with a solid axle portion 40. In this case, the recess is formed in the axle portion. Also, the orientation of the passages may be staggered in accordance with a given implementation. Further, a manifold for receiving pressurized fluid may be formed in the rotor in place of the conduit 56 and passages 82 and directly coupled through a fluid coupling slip ring (not shown) to a stationary pressurized source of fluid. Apertures corresponding to the passages may couple the manifold to the cutter edges to generate the desired streams. The scope of the present invention is as defined in the appended claims.

What is claimed is:

1. Apparatus for pelletizing material extruded through a die comprising:

shaft means extending along an axis, the shaft means having an outer surface and an internal fluid conduit for receiving pressurized fluid therein, the shaft means having a chamber in fluid communication with said internal fluid conduit and the outer surface in a given axial position, said chamber having a given axial extent parallel to the axis and having a partial circumferential extent about the shaft means and about the axis;

rotor means rotatably secured to the shaft means for rotation about said axis and having at least one fluid passage through the rotor means in communication with the shaft means, the at least one fluid passage being radially aligned with and in fluid communication with the chamber in a given angular position of the rotor means relative to the shaft means; and cutter means secured to the periphery of the rotor means for cutting said extruded material and including at least one cutting edge positioned for receiving the pressurized fluid forced from the at least one fluid passage when the at least one fluid passage and chamber are aligned;

said chamber being orientated such that said cutter means receives the pressurized fluid downstream away from said die to substantially preclude cooling said die with said pressurized fluid.

2. The apparatus of claim 1 wherein the at least one cutting edge extends in the axial direction of said axis, said at least one fluid passage comprising an array of spaced passages aligned with said at least one cutting edge, said array of spaced passages being in communication with the chamber when the at least one fluid passage is in said radial alignment whereby all said passages in communication with the chamber simultaneously receive said pressurized fluid.

3. The apparatus of claim 2 wherein the rotor means has a periphery and including an annular array of said at least one cutting edge spaced about said rotor means periphery, said rotor means including a plurality of said array of spaced passages, each array of spaced passages being aligned with a different cutting edge.

4. The apparatus of claim 3 wherein said chamber means is congruent with a surface area including a plurality of adjacent arrays of spaced passages.

5. The apparatus of claim 4 wherein the shaft means comprises a shaft and the chamber comprises a recess in the shaft surface having an axial extent parallel to said axis corresponding to the axial extent of the plurality of arrays of spaced passages parallel to said axis, said arrays of spaced passages each having about the same axial extent parallel to said axis.

6. The apparatus of claim 1 including means for securing the shaft means stationary.

7. The apparatus of claim 2 wherein the at least one cutting edge is linear and the array of spaced passages is linear and about the same axial extent parallel to said axis as the at least one cutting edge.

8. The apparatus of claim 1 further including said die coupled to the shaft means and spaced from said rotor means so the at least one cutting edge rotates to cut extruded material into pellets.

9. Apparatus for pelletizing material extruded through a die comprising:

a shaft extending along an axis, the shaft having an outer surface and an internal fluid conduit for receiving pressurized fluid therein, the shaft having a chamber in fluid communication with said internal fluid conduit and the outer surface in a given axial position, said chamber having a given axial extent parallel to the axis and having a partial circumferential extent about the shaft and about the axis;

a rotor rotatably secured to the shaft for rotation about said axis and having at least one fluid passage through the rotor in communication with the shaft, the at least one fluid passage being aligned with and in fluid communication with the chamber in a given angular position of the rotor relative to the shaft; and a plurality of cutters secured to the periphery of the rotor each for cutting said extruded material and each including at least one cutting edge positioned for receiving the pressurized fluid from the at least one fluid passage when the at least one fluid passage and chamber are aligned;

said at least one cutting edge being positioned relative to said chamber during its rotation by said rotor so as to initially cut the extruded material in a position spaced from said chamber followed by the at least one fluid passage being placed in said alignment with said chamber after completion of said cutting of said extruded material;

said chamber being located such that said cutters receive the pressurized fluid downstream away from said die to substantially preclude cooling said die with said pressurized fluid.

10. The apparatus of claim 1 wherein said chamber is positioned within an angular segment about said axis of at most 270° from the position of the die in the direction of rotation of the rotor means.

11. The apparatus of claim 10 wherein the at least one cutting edge extends in the axial direction of said axis, said at least one fluid passage comprising an array of spaced passages aligned with said at least one cutting edge, said array of spaced passages being in communication with the chamber when the at least one fluid passage is in said radial alignment whereby all said passages in said array of spaced passages simultaneously receive said pressurized fluid.

12. The apparatus of claim 11 wherein the rotor means has a periphery and including an annular array of said at least one cutting edge spaced about said rotor means periphery, said rotor means including a plurality of said arrays of spaced passages, each array of spaced passages being aligned with a different cutting edge.

13. Apparatus for pelletizing extruded material during extrusion comprising:

extrusion means for extruding material through a die;

support means including a shaft extending along an axis and having an outer surface and coupled to the extrusion means, the shaft having a fluid conduit for receiving pressurized cooling fluid therein, the shaft having a surface recess in fluid communication with said fluid conduit, said recess having a given axial extent parallel to said axis and a given partial circumferential extent about the shaft and the axis;

rotor means having a peripheral surface and being secured to the shaft for rotation relative to the shaft about said axis, said rotor means having at least one fluid passage in communication with the shaft, said at least one fluid passage passing through the rotor means to the peripheral surface thereof, the at least one fluid passage being radially aligned with and in fluid communication with the surface recess in a given angular position of the rotor means relative to the shaft; and cutter means secured to the periphery of the rotor means for cutting said extruded material and including at least one cutting edge positioned for receiving the pressurized fluid forced through the at least one fluid passage from the fluid conduit aligned with the surface recess;

said recess being located such that said cutter means receives the pressurized fluid downstream away from said die to substantially preclude cooling said die with said pressurized fluid.

14. The apparatus of claim 13 wherein the cutter means comprises a plurality of different annularly positioned cutters each having a cutting edge extending in the same axial direction, said at least one fluid passage comprising a plurality of different annularly positioned axially extending arrays of passages, each array of passages aligned with a different cutting edge for selective fluid communication with said surface recess in accordance with the angular position of the cutters about said axis.

15. The apparatus of claim 13 including means for securing the shaft stationary, the fluid conduit extending axially in the shaft, the fluid conduit including a radially extending portion in communication with said surface recess.

16. The apparatus of claim 15 wherein the surface recess is simultaneously congruent with a plurality of said at least one fluid passage.

17. The apparatus of claim 16 wherein the surface recess extends for about 180° about the axis.

18. The apparatus of claim 13 wherein the rotor means comprises a rotor having a peripheral surface and said at least one fluid passage, the cutter means comprises a cutter having a cutting edge, the cutting edge of the cutter being cantilevered over the at least one fluid passage in spaced relation to the rotor peripheral surface.

19. Apparatus for applying pressurized cooling fluid from a chamber having a fixed position relative to a rotating cutter for pelletizing material extruded through a die comprising:

rotor means having a peripheral surface and rotatable about an axis, the rotor means including internal conduit means selectively coupled to said chamber in a given angular position of the rotor means within a partial angular extent about the axis for generating at least one stream of cooling fluid while said rotor means is in said given angular position; and cutter means secured to the peripheral surface of the rotor means for cutting said extruded material and including at least one cutting edge positioned for receiving the generated at least one stream of cooling fluid in the given angular position;

said chamber being orientated such that said cutter means receives the pressurized fluid downstream away from said die to substantially preclude cooling said die with said pressurized fluid.

20. The apparatus of claim 19 including a plurality of cutting edges each extending in an axial direction of said axis and annularly spaced about said peripheral surface, said internal conduit means for generating a plurality of annularly spaced arrays of cooling fluid streams, the streams of each array for simultaneously impinging on a different one of said cutting edges.

21. The apparatus of claim 20 wherein said internal conduit means includes means arranged to generate a plurality of axially aligned cooling fluid streams in each said array and for sequentially generating said plurality of said arrays as the rotor means rotates.

22. The apparatus of claim 21 wherein the cutting edges and the axially aligned cooling fluid streams in each said array are equally spaced in the same angular spacing about said peripheral surface.

23. The apparatus of claim 19 wherein the cooling fluid is air.

24. The apparatus of claim 19 wherein the cooling fluid is a liquid.

25. The apparatus of claim 19 including a stationary shaft about which the rotor means rotates, the internal conduit means comprising an axially and angularly extending recess in the shaft forming a manifold, means for fluid coupling the recess to the source and to a plurality of passages through the rotor means aligned with the cutter means and in selective fluid communication with the recess in accordance with the angular position of the plurality of passages relative to the shaft as the rotor means rotates, said recess having a given angular extent about the shaft.

26. Apparatus for pelletizing material extruded through die comprising:

a shaft extending along an axis, the shaft having an outer surface and an internal fluid conduit for receiving pressurized fluid therein, the shaft having a chamber in fluid communication with said internal fluid conduit and the outer surface in a given axial position, said chamber having a given axial extent parallel to the axis end having a partial circumferential extent about the shaft and about the axis;

a rotor rotatably secured to the shaft for rotation about said axis and having at least one fluid passage through the rotor in communication with the shaft, the at least one fluid passage being radially aligned with and in fluid communication with the chamber only when in a given angular position of the rotor relative to the shaft; and a plurality of cutters secured to the periphery of the rotor for cutting said extruded material, each cutter including at least one cutting edge positioned for receiving the pressurized fluid forced from the at least one fluid passage only when the at least one fluid passage and chamber are aligned in said partial circumferential extent about said axis, whereby said cutters receive the pressurized fluid downstream away from said die to substantially preclude cooling said die with said pressurized fluid.

* * * * *